United States Patent
Tran et al.

(10) Patent No.: US 9,141,367 B2
(45) Date of Patent: Sep. 22, 2015

(54) APPLICATION MANAGEMENT FOR A WIRELESS COMMUNICATION DEVICE

(71) Applicant: Sprint Communications Company L.P., Overland Park, KS (US)

(72) Inventors: Tuan Q. Tran, Olathe, KS (US); Jason Ward, Lee's Summit, MO (US); Raymond Emilio Reeves, Oviedo, FL (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 14/279,013

(22) Filed: May 15, 2014

(65) Prior Publication Data

US 2014/0259006 A1     Sep. 11, 2014

Related U.S. Application Data

(63) Continuation of application No. 13/096,206, filed on Apr. 28, 2011, now Pat. No. 8,768,374.

(51) Int. Cl.
| | |
|---|---|
| *H04W 72/00* | (2009.01) |
| *G06F 9/445* | (2006.01) |
| *H04W 4/00* | (2009.01) |
| *H04W 4/02* | (2009.01) |

(52) U.S. Cl.
CPC .. *G06F 8/61* (2013.01); *G06F 8/65* (2013.01); *H04W 4/00* (2013.01); *H04W 4/02* (2013.01)

(58) Field of Classification Search
CPC .............. G06F 8/61; G06F 8/65; H04W 4/00; H04W 4/02
USPC ................ 455/452.2, 452.1, 410, 411, 412.1, 455/414.2
See application file for complete search history.

(56) References Cited

U.S. PATENT DOCUMENTS

| | | | |
|---|---|---|---|
| 6,154,778 A | 11/2000 | Koistinen et al. | |
| 7,069,023 B2 | 6/2006 | Maanoja et al. | |
| 8,200,790 B1* | 6/2012 | Reeves et al. | 709/220 |
| 8,265,594 B2 | 9/2012 | Davis et al. | |
| 8,280,369 B1 | 10/2012 | Reeves et al. | |
| 8,326,944 B1 | 12/2012 | Wick et al. | |
| 2003/0140131 A1* | 7/2003 | Chandrashekhar et al. | 709/223 |
| 2005/0219120 A1 | 10/2005 | Chang | |
| 2006/0039333 A1 | 2/2006 | Pirzada et al. | |
| 2008/0207217 A1* | 8/2008 | Ramanathan et al. | 455/456.1 |
| 2009/0183184 A1 | 7/2009 | Nadalin et al. | |
| 2010/0099405 A1 | 4/2010 | Brisebois et al. | |
| 2010/0145643 A1 | 6/2010 | Katpelly et al. | |

* cited by examiner

*Primary Examiner* — Khai M Nguyen

(57) ABSTRACT

A wireless communication device receives a user request to download a software application and wirelessly receives the software application. The wireless communication device presents multiple application management tiers for the software application. The wireless communication device receives a user selection of a first application management tier for the software application. The wireless communication wirelessly transfers the user selection of the first application management tier for the software application and wirelessly receives a network selection of a second application management tier for the software application from the communication network. The wireless communication presents the second application management tier for the software application.

20 Claims, 7 Drawing Sheets

| MANAGEMENT ITEM | SETTING |
|---|---|
| ACCESS REQUESTS | MEDIUM |
| BANDWIDTH | MEDIUM |
| SECURITY | HIGH |
| ROAMING | LOW |
| USER SELECTED TIER 400 | |

| MANAGEMENT ITEM | SETTING |
|---|---|
| ACCESS REQUESTS | MEDIUM |
| BANDWIDTH | MEDIUM |
| SECURITY | LOW |
| ROAMING | MEDIUM |
| PREDETERMINED TIER 450 | |

| MANAGEMENT ITEM | SETTING |
|---|---|
| ACCESS REQUESTS | MEDIUM |
| BANDWIDTH | MEDIUM |
| SECURITY | HIGH |
| ROAMING | LOW |
| USER SELECTED TIER 400 | |

| MANAGEMENT ITEM | SETTING |
|---|---|
| ACCESS REQUESTS | MEDIUM |
| BANDWIDTH | MEDIUM |
| SECURITY | LOW |
| ROAMING | MEDIUM |
| PREDETERMINED TIER 450 | |

FIGURE 4

APPLICATION MANAGEMENT FOR A WIRELESS COMMUNICATION DEVICE

RELATED CASES

This patent application is a continuation of U.S. patent application Ser. No. 13/096,206 that was filed on Apr. 28, 2011 and is entitled "APPLICATION MANAGEMENT FOR A WIRELESS COMMUNICATION DEVICE." U.S. patent application Ser. No. 13/096,206 is hereby incorporated by reference into this patent application.

TECHNICAL BACKGROUND

The use of wireless communication devices to send and receive information has become increasingly prominent. Typically, an operating system is installed on a wireless communication device to manage and coordinate the various functions that the device performs. In addition to the operating system, various applications are often available for the wireless communication device that are designed to execute on the operating system. A user of a wireless communication device typically downloads an application from an application server and installs the application on the device for execution by the operating system. Such applications are frequently developed by third parties that are different from the developer of the operating system. Some examples of applications available for wireless communication devices include news, sports, and weather applets, games, media players, business tools, educational software, social networking applications, and many more.

Typically, when the user of the wireless communication device opens an application, the operating system executes the processing instructions of the application to present the application content to the user. The application may be designed to utilize data transfer capabilities of the wireless communication device, location-based services, short message service (SMS) text messaging, accelerometers, camera equipment, and other features of modern wireless devices. However, applications written by unscrupulous authors may attempt to exploit the operating system for malicious purposes, which poses a security risk when executing an unknown or untested application.

Overview

A wireless communication device receives a user request to download a software application and wirelessly receives the software application. The wireless communication device presents multiple application management tiers for the software application. The wireless communication device receives a user selection of a first application management tier for the software application. The wireless communication wirelessly transfers the user selection of the first application management tier for the software application and wirelessly receives a network selection of a second application management tier for the software application from the communication network. The wireless communication presents the second application management tier for the software application.

BRIEF DESCRIPTION OF THE DRAWINGS

FIG. 4 is a block diagram that illustrates application management tiers in an exemplary embodiment.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
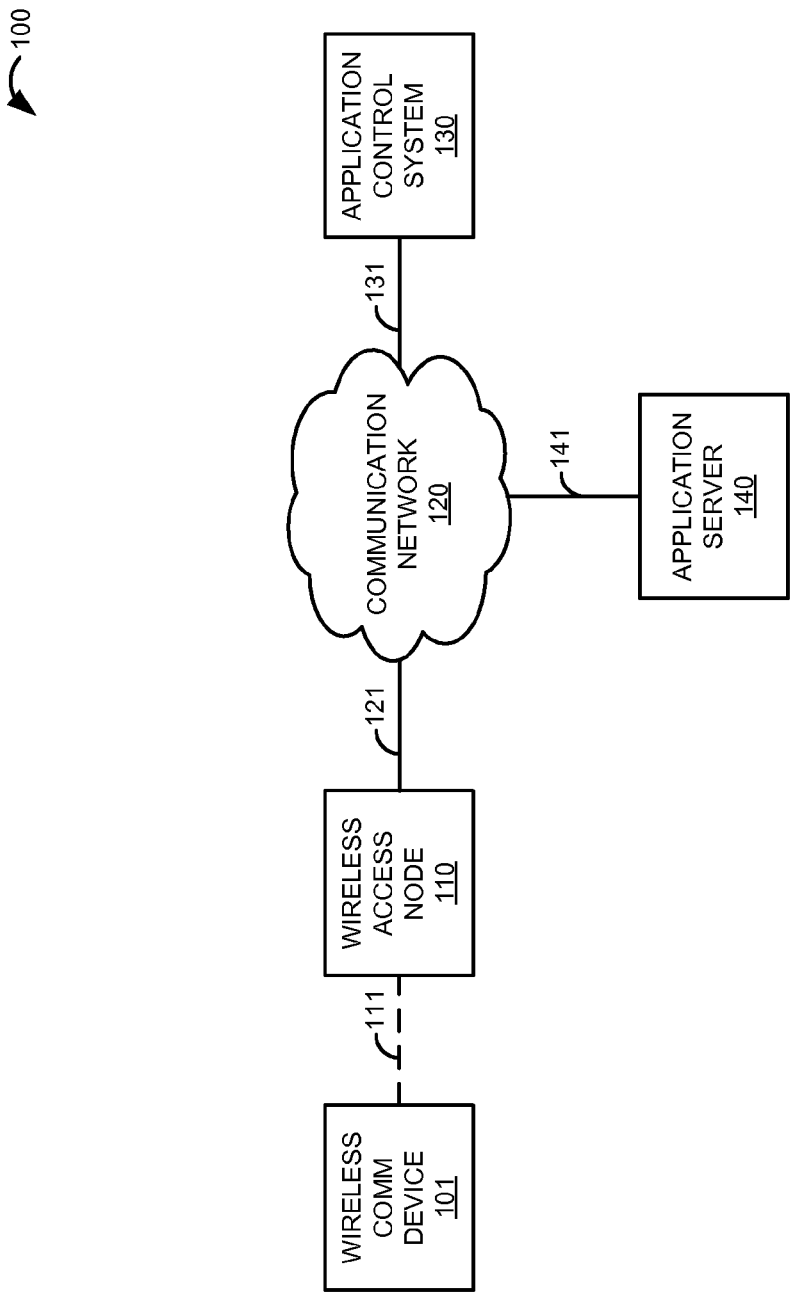
FIG. 1 is a block diagram that illustrates a communication system.

FIG. 1 is a block diagram that illustrates communication system 100. Communication system 100 includes wireless communication device 101, wireless access node 110, communication network 120, application control system 130, and application server 140. Wireless communication device 101 and wireless access node 110 are in communication over wireless communication link 111. Wireless access node 110 and communication network 120 are in communication over communication link 121. Communication network 120 and application control system 130 communicate over communication link 131. Application server 140 and communication network 120 are in communication over communication link 141.

Figure 2:
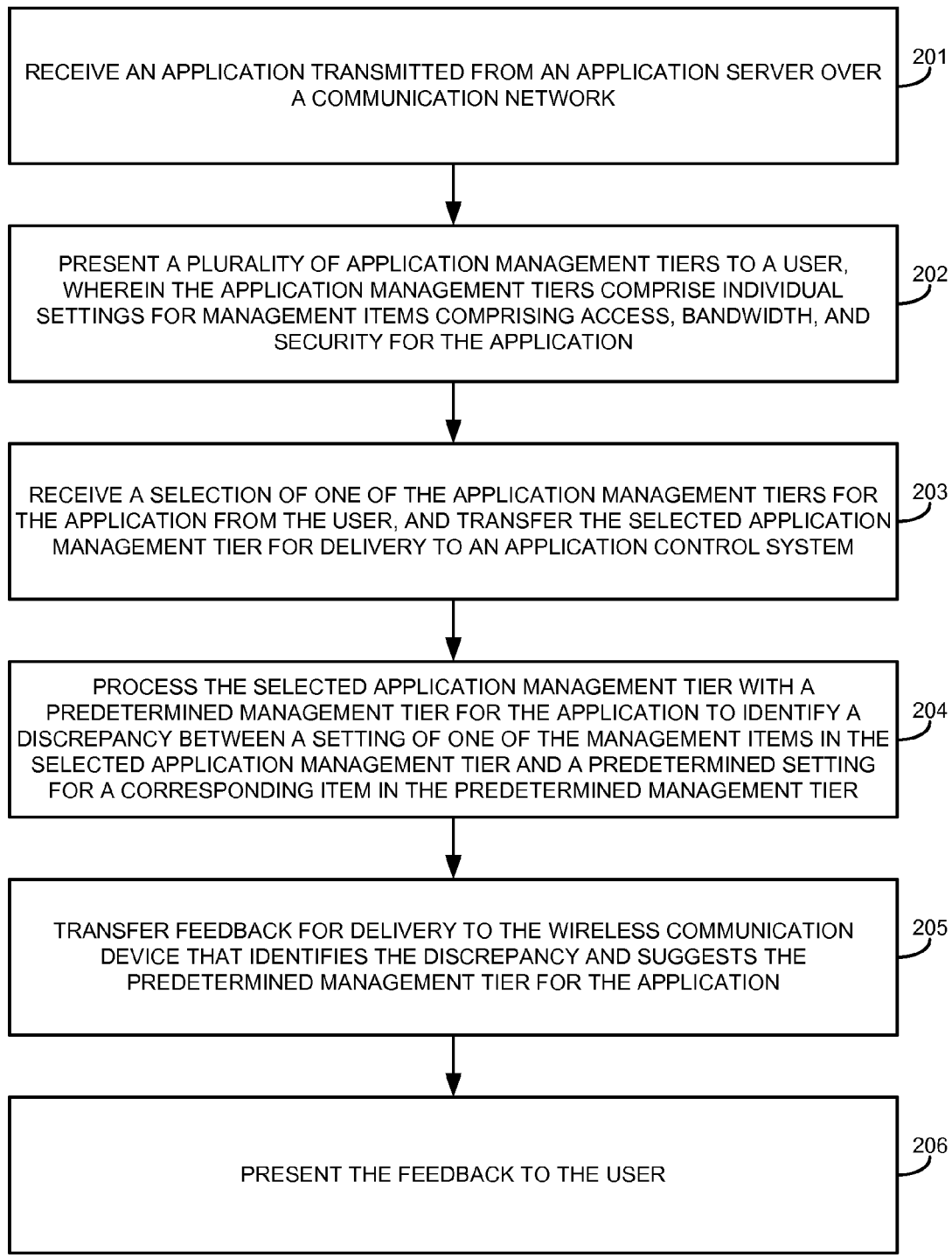
FIG. 2 is a flow diagram that illustrates an operation of the communication system.

FIG. 2 is a flow diagram that illustrates an operation of communication system 100. The steps of the operation are indicated below parenthetically. Initially, wireless communication device 101 receives an application transmitted from application server 140 over communication network 120 (201). Typically, a user of wireless communication device 101 requests the application from application server 140, although the application could be transferred to device 101 automatically, such as when device 101 downloads an automatic software update to a previously installed application. The application typically comprises third-party executable processing instructions configured to operate within an operating system of wireless communication device 101. In some examples, the application could comprise a standalone application, or could provide additional functionality to a previously installed primary program, such as a plug-in, add-on, software upgrade, or update.

Responsive to receiving the application, wireless communication device 101 presents a plurality of application management tiers to a user, wherein the application management tiers comprise individual settings for management items comprising access, bandwidth, and security for the application (202). Wireless communication device 101 typically presents the application management tiers to the user by displaying a list of the tiers on a user interface of device 101. In some examples, the application management tiers could be presented as broad management settings, such as "low," "medium," and "high" levels of management, or a numerical value on a scale of one to five. Additionally or alternatively, the application management tiers could present a more detailed view of the individual settings for the management items, such as a numerical value for each of the access, bandwidth, and security management items.

The management items of the application management tiers and their associated settings could be defined in many ways. For example, the settings for the access management item could comprise various levels of restrictions on a number of access requests for the application, such as a limit on the number of times the application can request a communication service from communication network 120 during a time period. In some examples, a highest setting of the access management item could limit the application to a predetermined number of data access requests. Likewise, the settings for the bandwidth management item could comprise restrictions on allowable rates of data throughput for the application. In some examples, a highest setting of the bandwidth management item could configure wireless communication device 101 to prompt the user to authorize data transfers for the application based on a location of device 101, such as when device 101 is roaming or in an area where device 101 is not typically operated. The security management item could comprise various safety measures to prevent the application from exploiting wireless communication device 101 and/or its operating system, such as virus and malware detection, firewall rules, and other security features. For example, a highest setting of the security management item could require a virus scan for the application, such as scanning for malware in newly downloaded updates to the application.

In some examples, the management items could additionally comprise roaming and battery usage restrictions for the application. Settings for the roaming management item provide various levels of restrictions on access requests and/or data usage for the application while wireless communication device 101 is roaming. For example, a highest setting of the roaming management item could restrict the application from downloading updates when wireless communication device 101 is roaming. Additionally, the battery usage management item could restrict the application from taking actions which are known to consume excessive amounts of battery power, such as preventing the application from utilizing system resources when the application is minimized and/or not being viewed by the user of wireless communication device 101. Other examples of management items and their respective settings within an application management tier are possible.

After presenting the application management tiers, wireless communication device 101 receives a selection of one of the application management tiers for the application from the user (203). Typically, the user will select one of the application management tiers from a list or menu that displays the various management tiers on wireless communication device 101. Wireless communication device 101 then transfers the selected application management tier for delivery to application control system 130 (203).

Application control system 130 processes the selected application management tier with a predetermined management tier for the application to identify a discrepancy between a setting of one of the management items in the selected application management tier and a predetermined setting for a corresponding item in the predetermined management tier (204). The predetermined management tier for the application could be provided to application control system 130 in a variety of ways. For example, application control system 130 could retrieve the predetermined management tier from a network database or other storage system, or network service personnel could manually analyze new applications as they are released and provide a predetermined management tier to application control system 130 for each application. In some examples, application control system 130 could process information associated with the application, such as a software author, country of origin, virus/malware scan results, and other data known about the application to determine the predetermined management tier for the application. In examples where the application is unknown to application control system 130, the predetermined management tier for the application could comprise a highest setting for the security management item. Additionally or alternatively, the predetermined management tier could include the most restrictive settings for the access and bandwidth management items by default if the application is unknown to application control system 130. In some examples, the predetermined management tier could comprise an application management tier selected by a majority of users of the application. For example, application control system 130 could be informed of which application management tier is selected by individual users when they install the application, and could select the predetermined management tier for the application based on the application management tier selected by a majority of the users.

To process the predetermined management tier for the application with the selected application management tier received from wireless communication device 101 to identify the discrepancy, application control system 130 typically compares the individual settings for the management items in the selected application management tier to the predetermined settings for corresponding items in the predetermined management tier. For example, if the management items are scored on a scale of one to five, application control system 130 could compare the values assigned to each management item in the selected application management tier to the values of the corresponding items in the predetermined tier to determine discrepancies between these values.

In some examples, the discrepancy could be identified based on threshold values. For example, for values on the scale of one to five, application control system 130 could apply a threshold difference of two or greater between the settings of corresponding items in the predetermined and selected application management tiers to determine that a discrepancy exists for items whose values meet or exceed this threshold differential. Continuing this example, if the selected application management tier has a setting of two for the access management item, but the predetermined management tier for the application has a setting of five for the access management item, application control system 130 would determine a difference of three between these corresponding items which exceeds the threshold differential of two. Application control system 130 would therefore identify a discrepancy between the setting of two for the access management item in the selected application management tier and the predetermined setting of five for the corresponding access item in the predetermined management tier.

Application control system 130 transfers feedback for delivery to wireless communication device 101 that identifies the discrepancy and suggests the predetermined management tier for the application (205). In some examples, the feedback could inform the user that the selected application management tier is overly restrictive on bandwidth for the application and could thus suggest the predetermined management tier having a less restrictive bandwidth setting than the selected application management tier. In other examples, the feedback could inform the user that the selected application management tier fails to provide sufficient security for the application and could therefore suggest the predetermined management tier having a higher security setting than the selected application management tier. For example, if the discrepancy is identified for the security management item, the feedback could indicate that the selected application management tier includes a setting which is lower than that recommended by application control system 130 based on the setting for the security management item in the predetermined management tier. The feedback would thus suggest the predetermined management tier be used for the application to ensure appropriate security measures are taken for the application.

Wireless communication device 101 presents the feedback to the user (206). To present the feedback, wireless communication device 101 typically displays the feedback on a user interface of device 101, although the feedback could be presented in another manner, such as audibly. Based on the feedback, the user may decide to change the selected application management tier for the application to the predetermined management tier suggested in the feedback. Alternatively, the user may select a different application management tier than the predetermined management tier that still addresses the identified discrepancy but does not provide exactly the same settings for the management items as set in the predetermined tier. The user may also choose to ignore the feedback and maintain the selected application management tier for the application in some examples.

Advantageously, the application management tiers for the application provide improved application management and help to safeguard wireless communication device 101 and a communication service provider from applications that may be prone to excessive data usage, access requests, or even malicious attacks. By comparing the application management tier selected by a user to a predetermined management tier, application control system 130 can intelligently and effectively generate useful feedback about the tier selected by the user. In this manner, the user will be better informed about settings for particular management items within the selected tier which may require augmentation, resulting in improved performance, security, and control of the application.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others—including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 120 comprises the core network of a wireless communication service provider, and could include routers, gateways, telecommunication switches, servers, processing systems, or other communication equipment and systems for providing communication and data services. Communication network 120 could comprise wireless communication nodes, telephony switches, Internet routers, network gateways, computer systems, communication links, or some other type of communication equipment—including combinations thereof. Communication network 120 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 120 may be configured to communicate over metallic, wireless, or optical links—including combinations thereof. Communication network 120 may be configured to use time-division multiplexing (TDM), Internet Protocol (IP), Ethernet, optical networking, wireless protocols, communication signaling, or some other communication format—including combinations thereof. In some examples, communication network 120 includes further access nodes and associated equipment for providing communication services to many wireless communication devices across a large geographic region.

Application control system 130 comprises a processing system and communication transceiver. Application control system 130 may also include other components such as a router, server, data storage system, and power supply. Application control system 130 may reside in a single device or may be distributed across multiple devices. Application control system 130 may be a discrete system or may be integrated within other systems—including other systems within communication system 100. In some examples, application control system 130 could comprise a network switch, mobile switching center, router, switching system, packet gateway, network gateway system, Internet access node, application server, service node, firewall, or some other communication system—including combinations thereof.

Application server 140 comprises a processing system and communication transceiver. Application server 140 may also include other components such as a router, server, data storage system, and power supply. Application server 140 may reside in a single device or may be distributed across multiple devices. Application server 140 may be a discrete system or may be integrated within other systems—including other systems within communication system 100. In some examples, application server 140 could comprise a network switch, mobile switching center, router, switching system, packet gateway, network gateway system, Internet access node, network server, database system, service node, firewall, or some other communication system—including combinations thereof.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121, 131, and 141 use metal, air, space, optical fiber such as glass or plastic, or some other material as the transport medium—including combinations thereof. Communication links 121, 131, and 141 could use various communication protocols, such as TDM, IP, Ethernet, telephony, optical networking, hybrid fiber coax (HFC), communication signaling, wireless protocols, or some other communication format—including combinations thereof. Communication links 121, 131, and 141 may be direct links or could include intermediate networks, systems, or devices.

Figure 3:
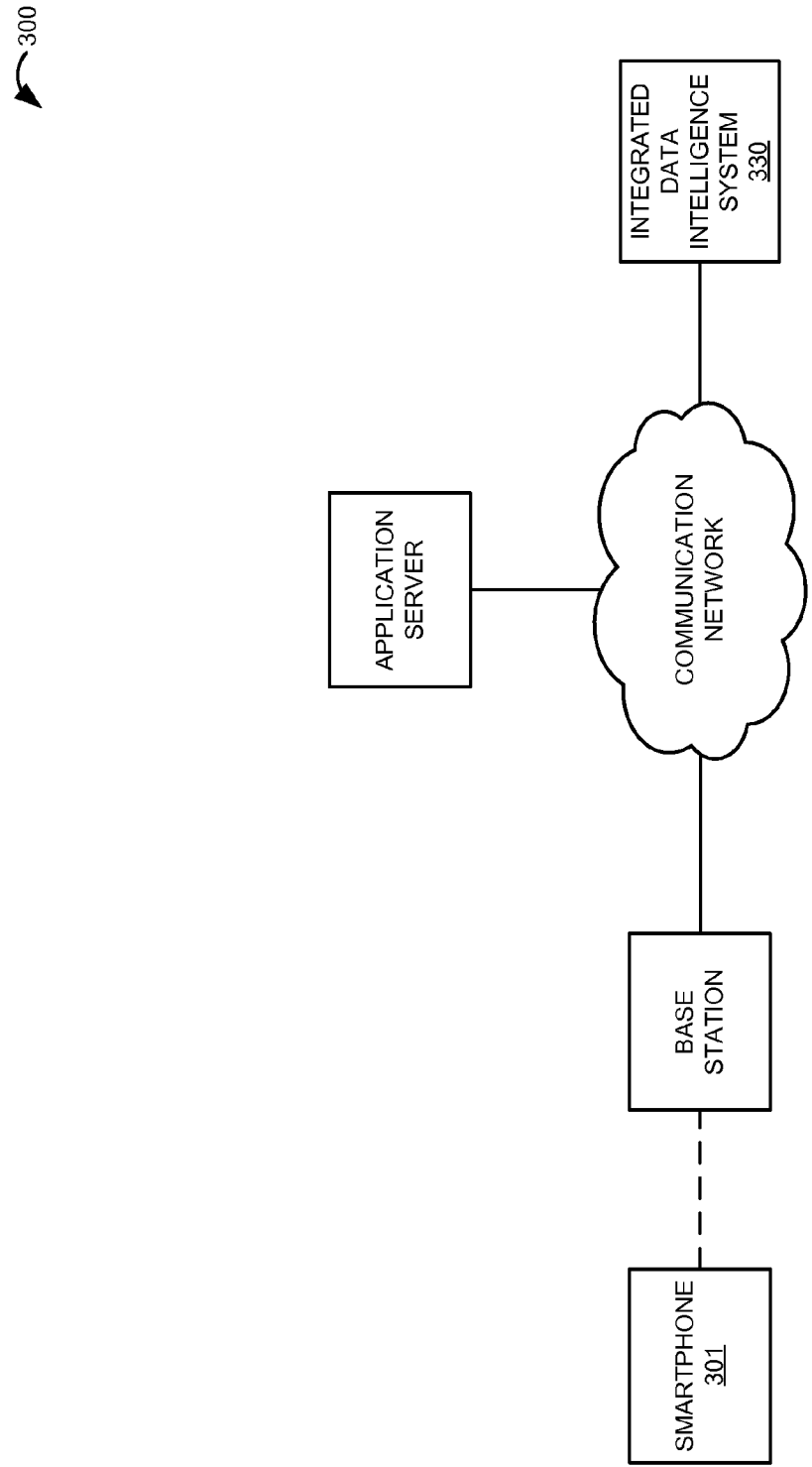
FIG. 3 is a block diagram that illustrates a communication system in an exemplary embodiment.

FIG. 3 is a block diagram that illustrates communication system 300 in an exemplary embodiment. Communication system 300 includes smartphone 301 and integrated data intelligence system (IDIS) 330. Smartphone 301 provides an example of wireless communication device 101 and IDIS 330 provides an example of application control system 130, although device 101 and system 130 may use alternative configurations. The following description of FIGS. 4 and 5 provides an exemplary application management technique in the context of communication system 300 as shown in FIG. 3.

FIG. 4 is a block diagram that illustrates application management tiers 400 and 450 in an exemplary embodiment. The application management tiers 400 and 450 comprise application management settings for a specific application that executes on smartphone 301. In particular, user selected tier 400 comprises an application management tier selected by a user of smartphone 301 for the application, and predetermined tier 450 comprises a predetermined management tier stored in IDIS 330. In this example, each tier 400 and 450 includes four management items, labeled "access requests", "bandwidth", "security", and "roaming", along with corresponding settings of either "low", "medium", or "high". As shown in FIG. 4, both user selected tier 400 and predetermined tier 450 have settings of "medium" for the "access requests" and "bandwidth" management items. However, the user selected tier 400 has a "high" setting for the "security" management item and a "low" setting for "roaming", whereas predetermined tier 450 has a "security" management item setting of "low" and a "medium" setting for the "roaming" management item. The application management tiers 400 and 450 will now be discussed with respect to the exemplary sequence diagram of FIG. 5.

Figure 5:
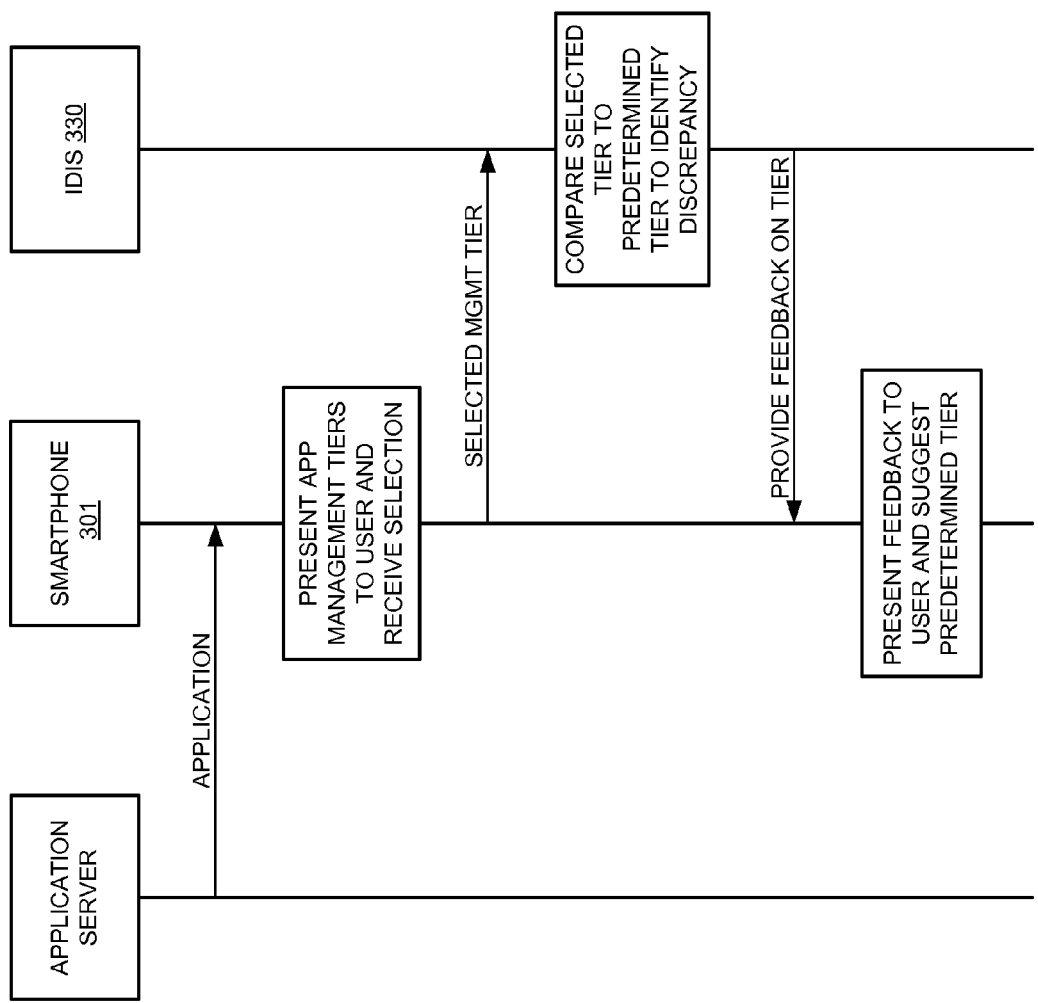
FIG. 5 is a sequence diagram that illustrates an operation of the communication system in an exemplary embodiment.

FIG. 5 is a sequence diagram that illustrates an operation of communication system 300 in an exemplary embodiment. In this example, the user of smartphone 301 requests to download a third-party gaming application designed to execute on the operating system of smartphone 301. Responsive to the download request, smartphone 301 receives the game from the application server. Upon receipt of the application, smartphone 301 presents a list of application management tiers to the user for managing the gaming application.

The application management tiers presented to the user include several management items and corresponding settings for each of the items. In this example, the settings for the management items are values of either "low", "medium", or "high". The user cautiously selects an application management tier having a "high" security setting, "medium" access and bandwidth settings, and a "low" roaming setting, as shown in user selected tier 400 in FIG. 4. The "medium" settings for access and bandwidth would place a reasonable limit on the number of access requests and data throughput allowed for the game without excessively restricting data transfers, while the "low" roaming setting would allow the game to upload and download data when smartphone 301 is roaming without restriction. However, the "high" security setting would require frequent virus scans of the game code along with any data that is exchanged with a communication network during game play, and also applies restrictive firewall rules that would prevent the game from exchanging data with unknown and blacklisted servers.

After the user selects application management tier 400, smartphone 301 transfers the user selected tier 400 for delivery to IDIS 330. IDIS 330 compares the user selected tier 400 to the predetermined tier 450 for the game to identify any discrepancies. In this example, the "access requests" and "bandwidth" items are set to "medium" in both user selected tier 400 and the predetermined management tier 450, so no discrepancy is identified for these items. Further, although the "roaming" management item is set to "low" on the user selected tier 400 but has a "medium" setting on predetermined tier 450, these settings only differ by one degree of magnitude, and IDIS 330 is configured to identify a discrepancy between management items only when their settings differ by greater than one order of magnitude in this example. Therefore, IDIS 330 identifies the "security" management item as a discrepancy based on the two orders of magnitude differential between the "low" setting in predetermined tier 450 and the "high" setting in the user selected tier 400. The security item is set to "low" in predetermined tier 450 because IDIS 330 has information related to the game that indicates the game originated from a trusted developer and that the performance of the game will suffer if excessive security is utilized. Therefore, IDIS 330 generates feedback for the user about the application management tier 400 selected by the user and transfers the feedback for delivery to smartphone 301.

Smartphone 301 receives the feedback and presents the feedback on a user interface for display to the user. The feedback identifies the discrepancy between the "security" management item in user selected tier 400 and the predetermined tier 450, and indicates to the user that a lower security setting should be used to avoid decreased performance of the game. The feedback suggests that the user should select the predetermined tier 450 for the game instead of the user selected tier 400. Thus, the user changes the application management tier for the game in accordance with the recommendation in the feedback and the newly selected tier 450 is associated with the game within smartphone 301. In this manner, IDIS 330 is able to effectively provide suggested management settings to the user of smartphone 301 when the user downloads this new gaming application, thereby improving the user experience and providing a communication service provider some degree of control over how third-party applications are managed on user devices.

Figure 6:
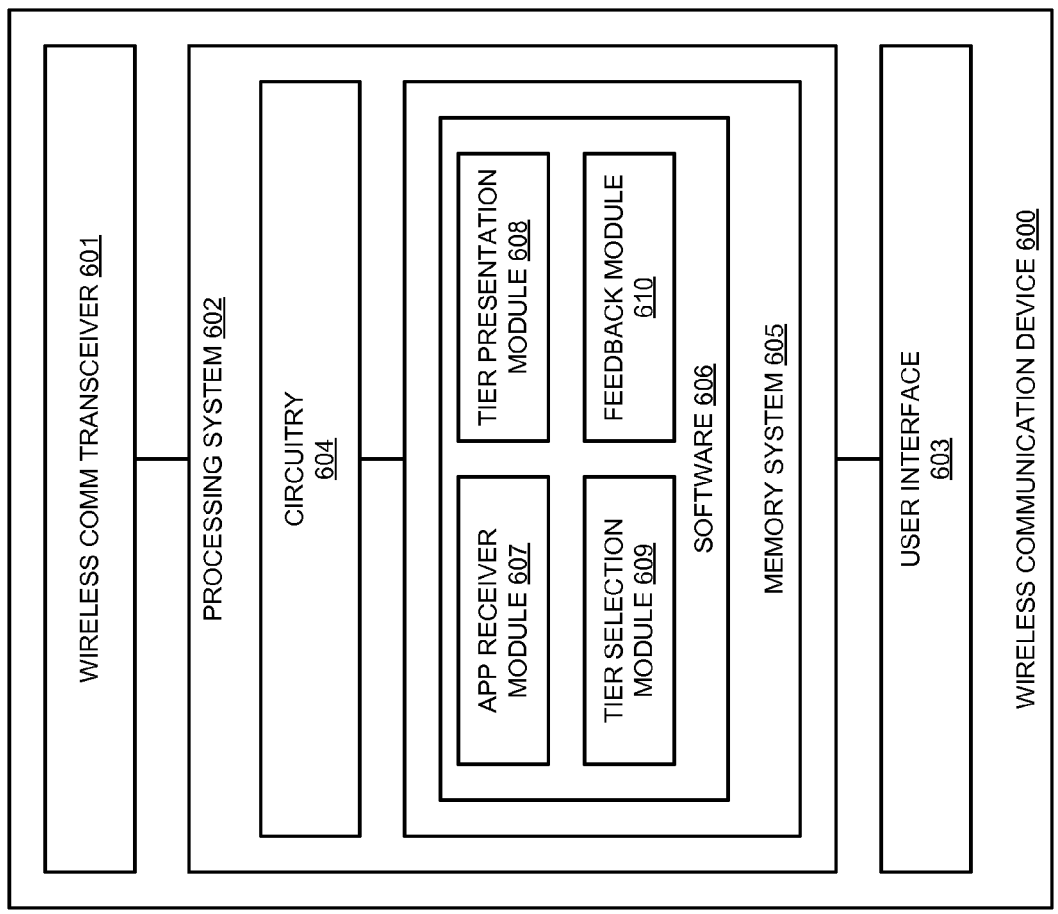
FIG. 6 is a block diagram that illustrates a wireless communication device.

FIG. 6 is a block diagram that illustrates wireless communication device 600. Wireless communication device 600 provides an example of wireless communication device 101, although device 101 could use alternative configurations. Wireless communication device 600 comprises wireless communication transceiver 601, processing system 602, and user interface 603. Processing system 602 is linked to wireless communication transceiver 601 and user interface 603. Processing system 602 includes processing circuitry 604 and memory system 605 that stores operating software 606. Operating software 606 comprises software modules 607-610. Wireless communication device 600 may include other well-known components such as a battery and enclosure that are not shown for clarity. Wireless communication device 600 may comprise a telephone, computer, e-book, mobile Internet appliance, media player, game console, wireless network interface card, or some other wireless communication apparatus—including combinations thereof.

Wireless communication transceiver 601 comprises RF communication circuitry and an antenna. The RF communication circuitry typically includes an amplifier, filter, RF modulator, and signal processing circuitry. Wireless communication transceiver 601 may also include a memory system, software, processing circuitry, or some other communication device. Wireless communication transceiver 601 may use various protocols, such as CDMA, GSM, UMTS, HSPA, EV-DO, EV-DO rev. A, 3GPP LTE, LTE Advanced, WiMAX, Wi-Fi, Bluetooth, Internet, telephony, or some other wireless communication format. Wireless communication transceiver 601 is configured to receive an application transmitted from an application server over a communication network, transfer a selected application management tier for delivery to an application control system, and receive feedback transmitted from the application control system.

User interface 603 comprises components that interact with a user to receive user inputs and to present media and/or information. User interface 603 may include a speaker, microphone, buttons, lights, display screen, touch screen, touch pad, scroll wheel, communication port, or some other user input/output apparatus—including combinations thereof. User interface 603 is configured to present a plurality of application management tiers to a user, wherein the application management tiers comprise individual settings for management items comprising access, bandwidth, and security for the application. User interface 603 is further configured to receive a selection of one of the application management tiers for the application from the user and present feedback to the user.

Processing circuitry 604 comprises microprocessor and other circuitry that retrieves and executes operating software 606 from memory system 605. Processing circuitry 604 may comprise a single device or could be distributed across multiple devices—including devices in different geographic areas. Processing circuitry 604 may be embedded in various types of equipment. Memory system 605 comprises a non-transitory computer readable storage medium, such as a disk drive, flash drive, data storage circuitry, or some other hardware memory apparatus. Memory system 605 may comprise a single device or could be distributed across multiple devices—including devices in different geographic areas. Memory system 605 may be embedded in various types of equipment. Processing circuitry 604 is typically mounted on a circuit board that may also hold memory system 605 and portions of communication transceiver 601 and user interface 603. Operating software 606 comprises computer programs, firmware, or some other form of machine-readable processing instructions. Operating software 606 may include an operating system, utilities, drivers, network interfaces, applications, or some other type of software. In this example, operating software 606 comprises software modules 607-610, although software 606 could have alternative configurations in other examples.

When executed by processing circuitry 604, operating software 606 directs processing system 602 to operate wireless communication device 600 as described herein for wireless communication device 101. In particular, operating software 606 directs processing system 602 to direct wireless communication transceiver 601 to receive an application transmitted from an application server over a communication network. Operating software 606 further directs processing system 602 to direct user interface 603 to present a plurality of application management tiers to a user, wherein the application management tiers comprise individual settings for management items comprising access, bandwidth, and security for the application, and to receive a selection of one of the application management tiers for the application from the user. In addition, operating software 606 directs processing system 602 to direct wireless communication transceiver 601 transfer the selected application management tier for delivery to an application control system, and to receive feedback transmitted from the application control system. Further, operating software 606 directs processing system 602 to direct user interface 603 to present the feedback to the user.

In this example, operating software 606 comprises an application receiver software module 607 that receives an application transmitted from an application server over a communication network. Additionally, operating software 606 comprises a tier presentation software module 608 that presents a plurality of application management tiers to a user, wherein the application management tiers comprise individual settings for management items comprising access, bandwidth, and security for the application. Operating software 606 also comprises a tier selection software module 609 that receives a selection of one of the application management tiers for the application from the user and transfers the selected application management tier for delivery to an application control system. Finally, operating software 606 comprises a feedback software module 610 that receives feedback transmitted from the application control system and presents the feedback to the user.

Figure 7:
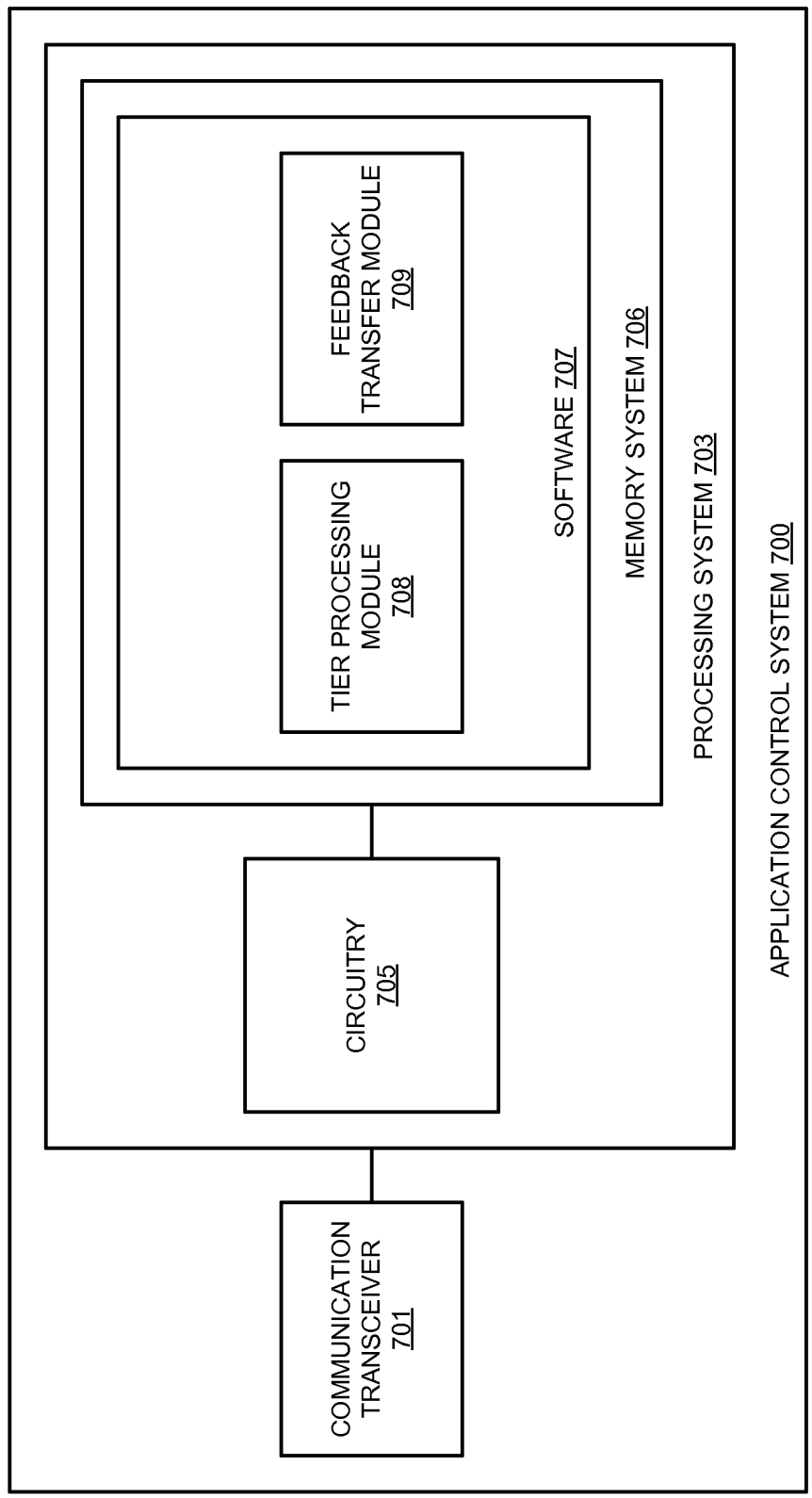
FIG. 7 is a block diagram that illustrates an application control system.

FIG. 7 is a block diagram that illustrates application control system 700. Application control system 700 provides an example of application control system 130, although system 130 may use alternative configurations. Application control system 700 comprises communication transceiver 701 and processing system 703. Processing system 703 is linked to communication transceiver 701. Processing system 703 includes processing circuitry 705 and memory system 706 that stores operating software 707. Operating software 707 comprises software modules 708 and 709.

Communication transceiver 701 comprises components that communicate over communication links, such as network cards, ports, RF transceivers, processing circuitry and software, or some other communication components. Communication transceiver 701 may be configured to communicate over metallic, wireless, or optical links. Communication transceiver 701 may be configured to use TDM, IP, Ethernet, optical networking, wireless protocols, communication signaling, or some other communication format—including combinations thereof. Communication transceiver 701 may be configured to receive a selected application management tier for an application transmitted from a wireless communication device. Further, communication transceiver 701 is configured to transfer feedback for delivery to the wireless communication device that identifies a discrepancy and suggests a predetermined management tier for the application.

Processing circuitry 705 comprises microprocessor and other circuitry that retrieves and executes operating software 707 from memory system 706. Processing circuitry 705 may comprise a single device or could be distributed across multiple devices—including devices in different geographic areas. Processing circuitry 705 may be embedded in various types of equipment. Memory system 706 comprises a non-transitory computer readable storage medium, such as a disk drive, flash drive, data storage circuitry, or some other hardware memory apparatus. Memory system 706 may comprise a single device or could be distributed across multiple devices—including devices in different geographic areas. Memory system 706 may be embedded in various types of equipment. Operating software 707 comprises computer programs, firmware, or some other form of machine-readable processing instructions. Operating software 707 may include an operating system, utilities, drivers, network interfaces, applications, or some other type of software. In this example, operating software 707 comprises software modules 708 and 709, although software 707 could have alternative configurations in other examples.

When executed by circuitry 705, operating software 707 directs processing system 703 to operate as described herein for application control system 130. In particular, operating software 707 may direct processing system 703 to direct communication transceiver 701 to receive a selected application management tier for an application transmitted from a wireless communication device. Further, operating software 707 directs processing system 703 to process the selected application management tier with a predetermined management tier for the application to identify a discrepancy between a setting of a management item in the selected application management tier and a predetermined setting for a corresponding item in the predetermined management tier. Additionally, operating software 707 directs processing system 703 to direct communication transceiver 701 to transfer feedback for delivery to the wireless communication device that identifies the discrepancy and suggests the predetermined management tier for the application.

In this example, operating software 707 comprises a tier processing software module 708 that processes a selected application management tier with a predetermined management tier for an application to identify a discrepancy between a setting of a management item in the selected application management tier and a predetermined setting for a corresponding item in the predetermined management tier. In addition, operating software 707 comprises a feedback transfer software module 709 that transfers feedback for delivery to a wireless communication device that identifies the discrepancy and suggests the predetermined management tier for the application.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device comprising:
   receiving a user request through a user interface to download a software application, and in response, wirelessly receiving the software application into the wireless communication device and presenting multiple application management tiers for the software application through the user interface;
   receiving a user selection through the user interface of a first one of the application management tiers for the software application, and in response, wirelessly transferring the user selection of the first one of the application management tiers for the software application and wirelessly receiving a network selection of a second one of the application management tiers for the software application from the communication network; and
   presenting the second one of the application management tiers for the software application through the user interface.

2. The method of claim 1 wherein presenting the second one of the application management tiers for the software application through the user interface comprises graphically displaying a first bandwidth control parameter for the first one of the management tiers in comparison with a second bandwidth control parameter for the second one of the management tiers.

3. The method of claim 1 wherein presenting the second one of the application management tiers for the software application through the user interface comprises graphically displaying a first network-access control parameter for the first one of the management tiers in comparison with a second network-access control parameter for the second one of the management tiers.

4. The method of claim 1 wherein presenting the second one of the application management tiers for the software application through the user interface comprises graphically displaying a first security control parameter for the first one of the management tiers in comparison with a second security control parameter for the second one of the management tiers.

5. The method of claim 1 wherein presenting the second one of the application management tiers for the software application through the user interface comprises graphically displaying a first battery control parameter for the first one of the management tiers in comparison with a second battery control parameter for the second one of the management tiers.

6. The method of claim 1 wherein presenting the second one of the application management tiers for the software application through the user interface comprises indicating that the second one of the application management tiers for the software application was selected by a majority of application users.

7. The method of claim 1 wherein presenting the second one of the application management tiers for the software application through the user interface comprises graphically displaying a bandwidth throughput for the first one of the management tiers in comparison with a higher bandwidth throughput parameter for the second one of the management tiers and displaying a security level for the first one of the management tiers in comparison with a lower security level for the second one of the management tiers.

8. The method of claim 7 wherein the software application comprises a gaming application.

9. The method of claim 7 wherein a provider of the software application is identified by a network data structure as a trusted application provider.

10. The method of claim 1 wherein the wireless communication device comprises a Long Term Evolution (LTE) device.

11. A wireless communication device comprising:
    a user interface configured to receive a user request to download a software application;

a wireless transceiver configured to wirelessly receive the software application;

a processing system configured to identify multiple application management tiers for the software application;

the user interface configured to present the multiple application management tiers for the software application and receive a user selection of a first one of the application management tiers for the software application;

the wireless transceiver configured to wirelessly transfer the user selection of the first one of the application management tiers for the software application and wirelessly receive a network selection of a second one of the application management tiers for the software application from the communication network; and the user interface configured to present the second one of the application management tiers for the software application.

12. The wireless communication device of claim 11 wherein the user interface is configured to graphically display a first bandwidth control parameter for the first one of the management tiers in comparison with a second bandwidth control parameter for the second one of the management tiers.

13. The wireless communication device of claim 11 wherein the user interface is configured to graphically display a first network-access control parameter for the first one of the management tiers in comparison with a second network-access control parameter for the second one of the management tiers.

14. The wireless communication device of claim 11 wherein the user interface is configured to graphically display a first security control parameter for the first one of the management tiers in comparison with a second security control parameter for the second one of the management tiers.

15. The wireless communication device of claim 11 wherein the user interface is configured to graphically display a first battery control parameter for the first one of the management tiers in comparison with a second battery control parameter for the second one of the management tiers.

16. The wireless communication device of claim 11 wherein the user interface is configured to graphically indicate that the second one of the application management tiers for the software application was selected by a majority of application users.

17. The wireless communication device of claim 11 wherein the user interface is configured to graphically display a bandwidth throughput for the first one of the management tiers in comparison with a higher bandwidth throughput parameter for the second one of the management tiers and to display a security level for the first one of the management tiers in comparison with a lower security level for the second one of the management tiers.

18. The wireless communication device of claim 17 wherein the software application comprises a gaming application.

19. The wireless communication device of claim 17 wherein a provider of the software application is identified by a network data structure as a trusted application provider.

20. The wireless communication device of claim 17 wherein the wireless communication device comprises a Long Term Evolution (LTE) device.

* * * * *